United States Patent
Shih

(10) Patent No.: US 9,228,137 B2
(45) Date of Patent: Jan. 5, 2016

(54) METHOD FOR MAKING DIESEL WITH LOW POLYAROMATIC CONTENT

(75) Inventor: Stuart S. Shih, Gainesville, VA (US)

(73) Assignee: ExxonMobil Research and Engineering Company, Annandale, NJ (US)

(*) Notice: Subject to any disclaimer, the term of this patent is extended or adjusted under 35 U.S.C. 154(b) by 477 days.

(21) Appl. No.: 13/106,418

(22) Filed: May 12, 2011

(65) Prior Publication Data

US 2011/0282118 A1    Nov. 17, 2011

Related U.S. Application Data

(60) Provisional application No. 61/395,601, filed on May 14, 2010.

(51) Int. Cl.
| | |
|---|---|
| C07C 5/10 | (2006.01) |
| C10G 45/64 | (2006.01) |
| C10G 45/58 | (2006.01) |
| C10G 45/62 | (2006.01) |

(52) U.S. Cl.
CPC ............. *C10G 45/64* (2013.01); *C10G 45/58* (2013.01); *C10G 45/62* (2013.01); *C10G 2300/1014* (2013.01); *C10G 2300/1018* (2013.01); *C10G 2300/1037* (2013.01); *C10G 2300/202* (2013.01); *C10G 2300/304* (2013.01); *C10G 2400/04* (2013.01)

(58) Field of Classification Search
USPC ......... 208/58, 87, 49, 28, 29, 33, 30, 27, 111, 208/18, 15, 118, 120; 585/254, 250, 266, 585/310
See application file for complete search history.

(56) References Cited

U.S. PATENT DOCUMENTS

| | | | |
|---|---|---|---|
| 4,137,148 A | 1/1979 | Gillespie et al. | |
| 4,181,598 A * | 1/1980 | Gillespie et al. | 208/58 |
| 5,098,684 A | 3/1992 | Kresge et al. | |
| 5,198,203 A | 3/1993 | Kresge et al. | |
| 5,246,568 A * | 9/1993 | Forbus et al. | 208/59 |
| 6,340,430 B1 | 1/2002 | Wood | |
| 6,517,704 B1 | 2/2003 | Carroll et al. | |
| 2007/0131581 A1* | 6/2007 | Lai et al. | 208/27 |
| 2009/0166251 A1 | 7/2009 | Hantzer et al. | |
| 2009/0215612 A1 | 8/2009 | McCarthy et al. | |
| 2009/0261015 A1* | 10/2009 | Joseck et al. | 208/27 |

OTHER PUBLICATIONS

M. F. L. Johnson, "Estimation of the Zeolite Content of a Catalyst from Nitrogen Adsorption Isotherms", Journal of Catalysis 52, 1978, pp. 425-431.
J. S. Beck, et al., "A New Family of Mesoporous Molecular Sieves Prepared with Liquid Crystal Templates", J. Am. Chem. Soc., 1992, 114, pp. 10834-10843.

* cited by examiner

*Primary Examiner* — In Suk Bullock
*Assistant Examiner* — Sharon Pregler
(74) *Attorney, Agent, or Firm* — Bruce M. Bordelon; Chad A. Guice

(57) ABSTRACT

Distillate feeds are hydroprocessed to produce a product having a low content of polyaromatic hydrocarbons (PAHs). The hydroprocessing includes dewaxing and aromatic saturation of the feed. The temperature of the aromatic saturation process can be controlled to make a distillate product having a desired aromatic content, such as less the 0.02 wt % of polyaromatic hydrocarbons having three or more aromatic rings.

20 Claims, 3 Drawing Sheets

METHOD FOR MAKING DIESEL WITH LOW POLYAROMATIC CONTENT

This application claims the benefit of Provisional U.S. Application No. 61/395,601, filed May 14, 2010, the contents of which are hereby incorporated by reference herein.

FIELD OF THE INVENTION

Methods are described below for making diesel fuel with reduced content of polyaromatics, or more specifically of hydrocarbons having three or more aromatic rings.

BACKGROUND OF THE INVENTION

Commercially available diesel fuels are subject to a variety of regulatory requirements that constrain the properties of the fuel. For example, diesel fuels are typically required to meet one or more specifications related to cold flow properties.

Another category of requirements for diesel fuels is aromatics specifications, such as a restriction on the total number of polyaromatic hydrocarbons (PAHs) present in a diesel fuel. A polyaromatic hydrocarbon refers to a hydrocarbon containing two or more aromatic rings. Various types of hydroprocessing reactions can potentially be used to reduce the PAH content of a hydrocarbon feed.

U.S. Pat. No. 6,340,430 describes a method for processing a diesel boiling range feed. A diesel feed can be separated into a lighter and heavier portion. The feed is described as normally having a sulfur content of greater than 0.15 wt %. The heavier portion is catalytically dewaxed. The dewaxing catalyst may contain silicalite, MFI zeolites, or silicoaluminophosphates. Preferably, the dewaxing catalyst is a non-zeolitic molecular sieve essentially free of Y zeolite. The lighter portion is added to the dewaxed heavier portion prior to an aromatics saturation step. The aromatics saturation process is described as preferably using a hydrogen to hydrocarbon ratio of about 5,000 to 18,000 scf $H_2$ per barrel of feedstock (about 890 to 3200 Normal, or standard, $m^3/m^3$). The dewaxing process is described as having a temperature at the inlet to the dewaxing process that is at least about 50° F. (30° C.) higher than the temperature at the inlet to the aromatics saturation zone.

SUMMARY OF THE INVENTION

One aspect of the invention relates to a method for producing a diesel fuel, comprising: treating a distillate boiling range feed by contacting the feed with a dewaxing catalyst under effective dewaxing conditions to form a dewaxed effluent, the effective dewaxing conditions including a dewaxing inlet temperature and a dewaxing outlet temperature, the dewaxing catalyst comprising a zeolitic molecular sieve and a hydrogenation metal; quenching the dewaxed effluent; and treating the quenched dewaxed effluent with an aromatic saturation catalyst different than the dewaxing catalyst under effective aromatic saturation conditions to form a product having a concentration of polyaromatic hydrocarbons with three or more rings of about 0.02 wt % or less, the effective aromatic saturation conditions including an inlet temperature that is at least about 20° C. lower than the dewaxing outlet temperature, wherein the dewaxed effluent, the quenched dewaxed effluent, or both exhibit a cloud point at least 10° C. lower than a cloud point of the distillate boiling range feed, and wherein the distillate boiling range feed, the quenched dewaxed effluent, or both exhibit a concentration of polyaromatic hydrocarbons with three or more rings of about 0.08 wt % or more.

Another aspect of the invention relates to a method for producing a diesel fuel, comprising: treating a distillate boiling range feed by contacting the feed with a dewaxing catalyst under effective dewaxing conditions to form a dewaxed effluent, the effective dewaxing conditions including a dewaxing inlet temperature and a dewaxing outlet temperature, the dewaxing catalyst comprising a zeolitic molecular sieve and a hydrogenation metal; quenching the dewaxed effluent; and treating the quenched dewaxed effluent with an aromatic saturation catalyst different than the dewaxing catalyst under effective aromatic saturation conditions including an inlet temperature for the aromatic saturation that differs from the dewaxing inlet temperature by about 25° C. or less, the inlet temperature for the aromatic saturation stage being about 300° C. or less, wherein the dewaxed effluent, the quenched dewaxed effluent, or both exhibit a cloud point at least 10° C. lower than a cloud point of the distillate boiling range feed.

DETAILED DESCRIPTION OF THE EMBODIMENTS

Overview

Figure 1:
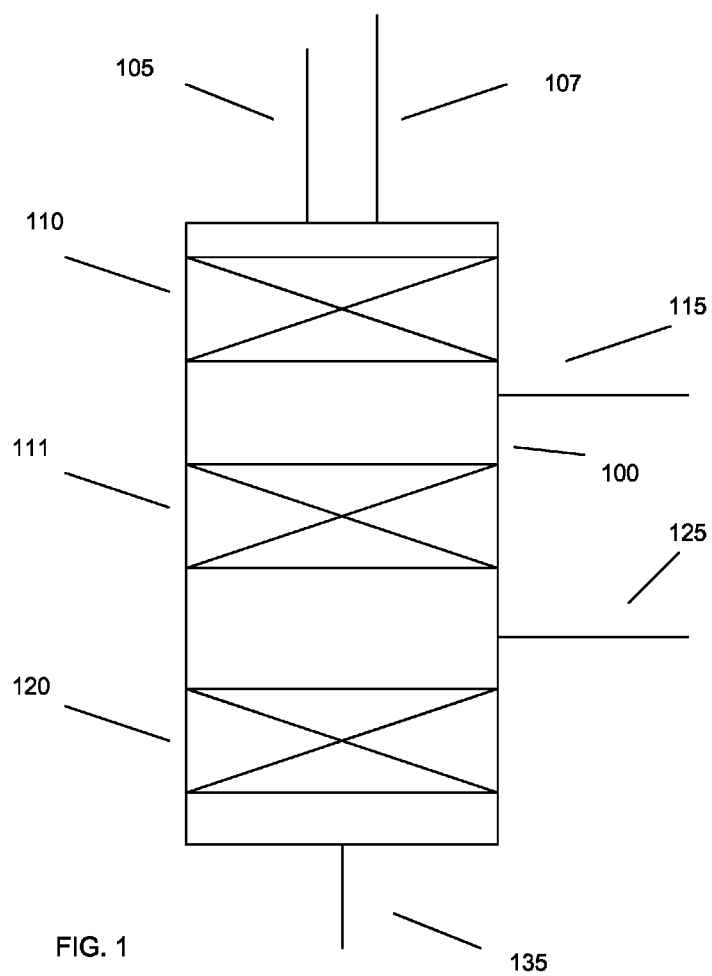
FIG. 1 schematically shows an example of a reaction system suitable for processing of a hydrocarbon feed according to the invention.

Reducing the amount of polyaromatic hydrocarbons having three or more aromatic rings may be of increasing interest in future years. Conventionally, controlling the total aromatics content in a diesel fuel has been sufficient to satisfy various regulations. However, the same techniques used to control total aromatic content may not be sufficient to address future concerns regarding polyaromatic hydrocarbons having three or more aromatic rings.

One type of diesel product that may be of concern is winter diesel, and in particular winter diesel for use in severe climates. For example, some conventional diesel fuels in the United States can have a cloud point of from about 0° F. (−18° C.) to about 25° F. (−4° C.). In some climates, however, temperatures can be well below 0° F. (−18° C.) during the winter. To accommodate these severe environments, diesel fuels can be made with cloud points between about −40° F. (−40° C.) to about −60° F. (−51° C.) or lower. Such diesel fuels can be produced by dewaxing a diesel fuel feed, but dewaxing processes can sometimes result in additional aromatic saturation. Additionally or alternately, a typical dewaxing process can produce a diesel fuel product with an undesirable concentration of polyaromatic hydrocarbons having three or more rings. In order to meet future needs, it can be desirable to have a process that can produce a (winter) diesel product having both a reduced cloud point and a reduced content of polyaromatic hydrocarbons.

In various embodiments, methods are provided for producing a diesel fuel product. A distillate boiling range feed can be hydroprocessed under dewaxing conditions followed by aromatic saturation conditions in order to produce a diesel fuel.

A quench stream can be used to reduce the temperature of the distillate boiling range feed during processing, such as in between catalyst beds or stages of the dewaxing and/or aromatic saturation. Optionally, one or more of the quench streams can be recycled effluent from the aromatic saturation. The quench streams can allow for control of the inlet temperature of the aromatic saturation stage, so that the inlet temperature is about 650° F. (about 343° C.) or less, for example about 625° F. (about 329° C.) or less or about 610° F. (about 321° C.) or less. The catalytic dewaxing can be performed using a zeolitic molecular sieve, such as ZSM-23 or ZSM-48, optionally but preferably including one or more additional metals deposited thereon. The aromatic saturation can be performed using a catalyst composed of a hydrogenation metal on a support having a surface area of greater than about 750 m$^2$/g, such as Pt and/or Pd supported on MCM-41. In an embodiment, the dewaxing catalyst and the aromatic saturation can be different, and can even be based on different substrates—for instance, the dewaxing catalyst can be based on a zeolitic substrate, while the aromatic saturation catalyst can be based on a non-zeolitic substrate and/or may not include a zeolite.

The method for producing a diesel fuel product can potentially provide several advantages. In some embodiments, a diesel fuel product with low aromatics content can be produced, e.g., an aromatics content of less than about 4 wt %. Additionally or alternately, the diesel fuel product can also have a PAH content of less than about 0.02 wt %. Further additionally or alternately, the method can allow for production of a diesel fuel product while using a reduced amount of hydrogen. A process with a lower hydrogen requirement generally corresponds to a process with a lower cost of operation. The rate of hydrogen flow relative to the feed for the combination of the dewaxing and aromatic saturation stages can be about 4500 scf/bbl (about 800 Sm$^3$/m$^3$) or less.

Prior regulations regarding aromatics content in diesel fuel have typically focused on either a total aromatic content or a total PAH content for the fuel. The amount of particular types of PAH compounds, such as 2-ring PAH compounds versus PAH compounds with 3 or more rings, was not specified. More recently, however, regulation proposals have been advanced for separately regulating the amount of PAH compounds with 3 or more rings in a diesel fuel.

During hydroprocessing, formation and/or removal of PAH compounds is believed to be an equilibrium process based on the reaction temperature. At temperatures above about 800° F. (about 427° C.), the amount of PAH compounds in a feed may actually increase, depending on the existing content of PAH compounds. More generally, a lower temperature for a hydroprocessing reaction can tend to lead to a lower product PAH content.

In some embodiments, the aromatics content and/or the PAH content of a feed can be reduced in part by controlling the inlet temperature of the aromatics saturation (or hydrofinishing) stages. For instance, an aromatics saturation stage downstream of the dewaxing stages can be operated to have an inlet temperature of about 650° F. (about 343° C.) or less, for example about 625° F. (about 329° C.) or less, about 610° F. (about 321° C.) or less, from about 500° F. (about 260° C.) to about 610° F. (321° C.), or from about 500° F. (about 260° C.) to about 600° F. (316° C.). This will typically be cooler than the inlet temperature of the prior catalytic dewaxing stages. Additionally, since catalytic dewaxing is typically an exothermic process, the outlet temperature of the catalytic dewaxing stages will typically also be higher. In order to control the temperature profile so that a desired inlet temperature is achieved for the aromatics saturation stage, one or more quench streams can be used.

Feedstock

In an embodiment, the feedstock can be a distillate boiling range feed. The feedstock can be a mineral feed, a biocomponent feed, or a combination thereof. Optionally, the feedstock can be hydrotreated and/or deoxygenated feed.

A mineral hydrocarbon feedstock refers to a hydrocarbon feedstock derived from crude oil that has optionally been subjected to one or more separation and/or other refining processes. The mineral hydrocarbon feedstock can be a petroleum feedstock boiling in the diesel range or above. Examples of suitable feedstocks can include, but are not limited to, virgin distillates, hydrotreated virgin distillates, kerosene, diesel boiling range feeds (such as hydrotreated diesel boiling range feeds), light cycle oils, and the like, and combinations thereof.

In some embodiments, the mineral hydrocarbon feedstock can be hydrotreated and/or can have a relatively low sulfur and nitrogen content. In such embodiments, the sulfur content can advantageously be about 100 wppm or less, for example about 50 wppm or less, about 20 wppm or less, or about 10 wppm or less. Additionally or alternately in such embodiments, the nitrogen content can be about 50 wppm or less, for example about 20 wppm or less or about 10 wppm or less.

In some alternative embodiments, a "sour" feed having a relatively higher level of sulfur and/or nitrogen contaminants can be used. In such embodiments, the nitrogen content can be at least about 50 wppm, for example at least about 75 wpm or at least about 100 wppm. Even in such "sour" embodiments, the nitrogen content can optionally but preferably be about 2000 wppm or less, for example about 1500 wppm or less or about 1000 wppm or less. Additionally or alternately in such "sour" embodiments, the sulfur content can be at least about 100 wppm, for example at least about 200 wppm or at least about 500 wppm. Further additionally or alternately, even in such "sour" embodiments, the sulfur content can optionally but preferably be about 5000 wppm or less, for example about 2500 wppm or less or about 1000 wppm or less.

In the discussion below, a biocomponent feedstock refers to a hydrocarbon feedstock derived from a biological raw material component, from biocomponent sources such as vegetable, animal, fish, and/or algae. Note that, for the purposes of this document, vegetable fats/oils refer generally to any plant based material, and can include fat/oils derived from a source such as plants of the genus *Jatropha*. Generally, the biocomponent sources can include vegetable fats/oils, animal fats/oils, fish oils, pyrolysis oils, and algae lipids/oils, as well as components of such materials, and in some embodiments can specifically include one or more type of lipid compounds. Lipid compounds are typically biological compounds that are insoluble in water, but soluble in nonpolar (or fat) solvents. Non-limiting examples of such solvents include alcohols, ethers, chloroform, alkyl acetates, benzene, and combinations thereof.

Major classes of lipids include, but are not necessarily limited to, fatty acids, glycerol-derived lipids (including fats, oils and phospholipids), sphingosine-derived lipids (including ceramides, cerebrosides, gangliosides, and sphingomyelins), steroids and their derivatives, terpenes and their derivatives, fat-soluble vitamins, certain aromatic compounds, and long-chain alcohols and waxes.

In living organisms, lipids generally serve as the basis for cell membranes and as a form of fuel storage. Lipids can also be found conjugated with proteins or carbohydrates, such as in the form of lipoproteins and lipopolysaccharides.

Examples of vegetable oils that can be used in accordance with this invention include, but are not limited to rapeseed (canola) oil, soybean oil, coconut oil, sunflower oil, palm oil, palm kernel oil, peanut oil, linseed oil, tall oil, corn oil, castor oil, jatropha oil, jojoba oil, olive oil, flaxseed oil, camelina oil, safflower oil, babassu oil, tallow oil, and rice bran oil.

Vegetable oils as referred to herein can also include processed vegetable oil material. Non-limiting examples of processed vegetable oil material include fatty acids and fatty acid alkyl esters. Alkyl esters typically include $C_1$-$C_5$ alkyl esters. One or more of methyl, ethyl, and propyl esters are preferred.

Examples of animal fats that can be used in accordance with the invention include, but are not limited to, beef fat (tallow), hog fat (lard), turkey fat, fish fat/oil, and chicken fat. The animal fats can be obtained from any suitable source including restaurants and meat production facilities.

Animal fats as referred to herein also include processed animal fat material. Non-limiting examples of processed animal fat material include fatty acids and fatty acid alkyl esters. Alkyl esters typically include $C_{10}C_5$ alkyl esters. One or more of methyl, ethyl, and propyl esters are preferred.

Algae oils or lipids are typically contained in algae in the form of membrane components, storage products, and metabolites. Certain algal strains, particularly microalgae such as diatoms and cyanobacteria, contain proportionally high levels of lipids. Algal sources for the algae oils can contain varying amounts, e.g., from 2 wt % to 40 wt % of lipids, based on total weight of the biomass itself.

Algal sources for algae oils include, but are not limited to, unicellular and multicellular algae. Examples of such algae include a rhodophyte, chlorophyte, heterokontophyte, tribophyte, glaucophyte, chlorarachniophyte, euglenoid, haptophyte, cryptomonad, dinoflagellum, phytoplankton, and the like, and combinations thereof. In one embodiment, algae can be of the classes Chlorophyceae and/or Haptophyta. Specific species can include, but are not limited to, *Neochloris oleoabundans, Scenedesmus dimorphus, Euglena gracilis, Phaeodactylum tricornutum, Pleurochrysis carterae, Prymnesium parvum, Tetraselmis chui,* and *Chlamydomonas reinhardtii.*

The biocomponent feeds usable in the present invention can include any of those which comprise primarily triglycerides and free fatty acids (FFAs). The triglycerides and FFAs typically contain aliphatic hydrocarbon chains in their structure having from 8 to 36 carbons, preferably from 10 to 26 carbons, for example from 14 to 22 carbons. Types of triglycerides can be determined according to their fatty acid constituents. The fatty acid constituents can be readily determined using Gas Chromatography (GC) analysis. This analysis involves extracting the fat or oil, saponifying (hydrolyzing) the fat or oil, preparing an alkyl (e.g., methyl) ester of the saponified fat or oil, and determining the type of (methyl) ester using GC analysis. In one embodiment, a majority (i.e., greater than 50%) of the triglyceride present in the lipid material can be comprised of $C_{10}$ to $C_{26}$, for example $C_{12}$ to $C_{18}$, fatty acid constituents, based on total triglyceride present in the lipid material. Further, a triglyceride is a molecule having a structure substantially identical to the reaction product of glycerol and three fatty acids. Thus, although a triglyceride is described herein as being comprised of fatty acids, it should be understood that the fatty acid component does not necessarily contain a carboxylic acid hydrogen. Other types of feed that are derived from biological raw material components can include fatty acid esters, such as fatty acid alkyl esters (e.g., FAME and/or FAEE).

Biocomponent based diesel boiling range feedstreams typically have relatively low nitrogen and sulfur contents. For example, a biocomponent based feedstream can contain up to about 500 wppm nitrogen, for example up to about 300 wppm nitrogen or up to about 100 wppm nitrogen. Instead of nitrogen and/or sulfur, the primary heteroatom component in biocomponent feeds is oxygen. Biocomponent diesel boiling range feedstreams, e.g., can include up to about 10 wt % oxygen, up to about 12 wt % oxygen, or up to about 14 wt % oxygen. Suitable biocomponent diesel boiling range feedstreams, prior to hydrotreatment, can include at least about 5 wt % oxygen, for example at least about 8 wt % oxygen.

In an embodiment, the feedstock can include up to about 100% of a feed having a biocomponent origin. This can be a hydrotreated vegetable oil feed, a hydrotreated fatty acid alkyl ester feed, or another type of hydrotreated biocomponent feed. A hydrotreated biocomponent feed can be a biocomponent feed that has been previously hydroprocessed to reduce the oxygen content of the feed to about 500 wppm or less, for example to about 200 wppm or less or to about 100 wppm or less. Correspondingly, a biocomponent feed can be hydrotreated to reduce the oxygen content of the feed, prior to other optional hydroprocessing, to about 500 wppm or less, for example to about 200 wppm or less or to about 100 wppm or less. Additionally or alternately, a biocomponent feed can be blended with a mineral feed, so that the blended feed can be tailored to have an oxygen content of about 500 wppm or less, for example about 200 wppm or less or about 100 wppm or less. In embodiments where at least a portion of the feed is of a biocomponent origin, that portion can be at least about 2 wt %, for example at least about 5 wt %, at least about 10 wt %, at least about 20 wt %, at least about 25 wt %, at least about 35 wt %, at least about 50 wt %, at least about 60 wt %, or at least about 75 wt %. Additionally or alternately, the biocomponent portion can be about 75 wt % or less, for example about 60 wt % or less, about 50 wt % or less, about 35 wt % or less, about 25 wt % or less, about 20 wt % or less, about 10 wt % or less, or about 5 wt % or less.

In embodiments where the feed is a mixture of a mineral feed and a biocomponent feed, the mixed feed can have a sulfur content of about 5000 wppm or less, for example about 2500 wppm or less, about 1000 wppm or less, about 500 wppm or less, about 200 wppm or less, about 100 wppm or less, about 50 wppm or less, about 30 wppm or less, about 20 wppm or less, about 15 wppm or less, or about 10 wppm or less. Optionally, the mixed feed can have a sulfur content of at least about 100 wppm of sulfur, or at least about 200 wppm, or at least about 500 wppm. Additionally or alternately in embodiments where the feed is a mixture of a mineral feed and a biocomponent feed, the mixed feed can have a nitrogen content of about 2000 wppm or less, for example about 1500 wppm or less, about 1000 wppm or less, about 500 wppm or less, about 200 wppm or less, about 100 wppm or less, about 50 wppm or less, about 30 wppm or less, about 20 wppm or less, about 15 wppm or less, or about 10 wppm or less.

In some embodiments, a dewaxing catalyst can be used that includes the sulfide form of a metal, such as a dewaxing catalyst that includes nickel and tungsten. In such embodiments, it can be beneficial for the feed to have at least a minimum sulfur content. The minimum sulfur content can be sufficient to maintain the sulfided metals of the dewaxing catalyst in a sulfided state. For example, the feedstock can have a sulfur content of at least about 100 wppm, or at least about 150 wppm, or at least about 200 wppm. Alternatively, the feedstock can have a sulfur content of about 500 wppm or less, or about 400 wppm or less, or about 300 wppm or less. In yet another embodiment, the additional sulfur to maintain the metals of a dewaxing catalyst in a sulfide state can be provided by gas phase sulfur, such as $H_2S$. One potential source of H$_2$S gas can be from hydrotreatment of the mineral portion of a feed. If a mineral feed portion is hydrotreated prior to combination with a biocomponent feed, a portion of the gas phase effluent from the hydrotreatment process or stage can be cascaded along with hydrotreated liquid effluent.

The content of sulfur, nitrogen, oxygen, and olefins (inter alia) in a feedstock created by blending two or more feedstocks can typically be determined using a weighted average based on the blended feeds. For example, a mineral feed and a biocomponent feed can be blended in a ratio of about 80 wt % mineral feed and about 20 wt % biocomponent feed. In such a scenario, if the mineral feed has a sulfur content of about 1000 wppm, and the biocomponent feed has a sulfur content of about 10 wppm, the resulting blended feed could be expected to have a sulfur content of about 802 wppm.

Diesel feedstreams suitable for use in the invention can have a boiling range from about 215° F. (about 102° C.) to about 800° F. (about 427° C.). In such embodiments, the diesel boiling range feedstream can have an initial boiling point of at least about 250° F. (about 121° C.), for example at least about 300° F. (about 149° C.), at least about 350° F. (about 177° C.), at least about 400° F. (about 204° C.), or at least about 451° F. (about 233° C.). Additionally or alternately in such embodiments, the diesel boiling range feedstream can have a final boiling point of about 800° F. (about 427° C.) or less, for example about 775° F. (about 413° C.) or less, about 750° F. (about 399° C.) or less. Further additionally or alternately, the diesel boiling range feedstream can have a boiling range from about 451° F. (about 233° C.) to about 800° F. (about 427° C.). Still further additionally or alternately, the diesel boiling range feedstream can also include kerosene range compounds to provide a feedstream with a boiling range from about 250° F. (about 121° C.) to about 800° F. (about 427° C.).

In an embodiment, a diesel boiling range feedstream for use as a feed to a dewaxing stage in the invention can have a cloud point of at least about −10° F. (about −23° C.), for example at least about 0° F. (about −18° C.) or at least about 5° F. (about −15° C.). Additionally or alternately, the diesel boiling range feedstream can have a cloud point of about 41° F. (about 5° C.) or less, preferably about 32° F. (about 0° C.) or less, for example about 25° F. (about −4° C.) or less, about 15° F. (about −9° C.) or less, or about 10° F. (about −12° C.) or less. Further additionally or alternately, the content of polyaromatic hydrocarbons having 3 or more aromatic rings in the dewaxing stage feed (and/or in the feed to the aromatic saturation stage) can be at least about 0.08 wt %, for example at least about 0.1 wt %. Still further additionally or alternately, the total aromatic content of the feed can be at least about 10 wt %, for example at least about 15 wt %, at least about 20 wt %, or at least about 25 wt %.

Reactor Configuration

In various embodiments, a reaction system suitable for performing the inventive method can include at least one dewaxing stage and at least one aromatic saturation (or hydrofinishing) stage. Note that a reaction stage can include one or more beds. In one embodiment, the dewaxing and aromatic saturation stages can be located in a single reactor. Alternately, the dewaxing stage(s) can be in a separate reactor from the aromatic saturation stage(s).

A quench stream can be introduced between the dewaxing stage(s) and the aromatic saturation stage(s). The quench stream can be used to control the temperature at the inlet of the aromatic saturation stage(s). The quench stream can be a liquid quench stream or a gas quench stream. For a liquid quench, the quench can be a recycled portion of the product from the aromatic saturation stage(s). Optionally, the recycled portion of the product from the aromatic saturation stage(s) can be passed through a heat exchanger to control the temperature of the quench stream. For a gas quench, any convenient gas can be used. One option can be to use an inert gas. Another option can be to introduce a reactive quench gas, such as hydrogen, which may optionally include some portion of inert gas, if intermediate reactivity is desired.

In addition to the quench stream between the dewaxing and aromatic saturation stages, one or more quench streams can optionally also be used between multiple dewaxing beds/stages. For example, in an embodiment involving a single reactor, a quench stream can be used to divide the catalytic dewaxing portion of the reactor into two dewaxing "stages". Because hydroprocessing reactions are typically exothermic, using a quench stream between dewaxing stages/beds can be used to control the temperature profile within the catalytic dewaxing stages. A quench stream can reduce the variation in temperature between the inlet of the first dewaxing stage and the final dewaxing stage, which can reduce the amount of temperature reduction needed between the outlet of the final dewaxing stage and the inlet to the aromatic saturation stage(s). The quench stream can be a gas phase quench stream or a liquid phase quench stream. For a gas phase quench stream, any convenient gas can be used, such as inert gas or hydrogen. If a liquid quench stream is used, the liquid can be recycled product from the aromatic saturation stage(s) or a portion of the effluent from another (e.g., the last) dewaxing stage.

Additionally or alternately to intra-dewaxing quenches, additional quench streams can be used between aromatic saturation beds/stages. Similar to the quench streams described above, a quench stream between aromatic saturation stages can be a recycled product stream, an inert gas stream, a hydrogen stream, another convenient stream, or some combination thereof.

Optionally, the quench streams can be used to introduce hydrogen gas (optionally including some inert gas, if intermediate reactivity is desired) into the various stages to facilitate hydroprocessing. The hydrogen can be recycled hydrogen or fresh hydrogen. The quench stream hydrogen can serve the purpose of being "make-up" hydrogen to replace hydrogen consumed during a prior hydroprocessing stage.

If desired, the overall hydrogen treat gas rate in the combination of the dewaxing stage(s) and the aromatic saturation stage(s) can be controlled to provide an effective level of saturation and/or removal of aromatics while using a reduced amount of hydrogen gas. The total hydrogen treat gas rate in the dewaxing and aromatics stages can correspond to any hydrogen treat gas introduced into the dewaxing and aromatic stages. This can include hydrogen gas introduced into the dewaxing stages with a feed, hydrogen gas used as a quench stream between stages, hydrogen gas introduced as a make-up gas stream into a stage, other hydrogen gas streams introduced into either a dewaxing or aromatic saturation stage, or some combination thereof. Note that a source of hydrogen gas should only be counted once. Thus, hydrogen that is initially introduced into a dewaxing stage and then cascaded into an aromatic saturation stage should not be counted again upon entering the aromatic saturation stage. In an embodiment, the total hydrogen treat gas rate in the dewaxing and aromatic saturation stages can be about 4500 scf/bbl (about 800 Sm$^3$/m$^3$) or less, for example about 4000 scf/bbl (about 710 Sm$^3$/m$^3$) or less or about 3500 scf/bbl (about 620 Sm$^3$/m$^3$) or less. Note that the treat gas rate described here is a hydrogen treat gas rate. If a hydrogen gas stream is used that contains a diluents, such as an inert gas, the treat rate can be proportionally higher. For example, a stream having about 5000 scf/bbl of about 90 vol % hydrogen would correspond to a ~100 vol % hydrogen stream of about 4500 scf/bbl.

The dewaxing stage(s) and the aromatic saturation stage(s) can sometimes be located in separate reactors. In such embodiments, a heat exchanger can optionally replace the quench between the dewaxing and aromatic saturation stages, although one or more quench streams can still be used between multiple dewaxing stages and/or between multiple aromatic saturation stages.

Dewaxing Process and Catalyst

Suitable dewaxing catalysts can include molecular sieves such as crystalline aluminosilicates (zeolites). In an embodiment, the molecular sieve can comprise, consist essentially of, or be ZSM-5, ZSM-23, ZSM-35, ZSM-48, zeolite Beta, or a combination thereof, for example ZSM-23 and/or ZSM-48. Additionally or alternately, the molecular sieve can comprise, consist essentially of, or be a 10-member ring 1-D molecular sieve. Optionally but preferably, the dewaxing catalyst can include a binder for the molecular sieve, such as alumina, titania, silica, silica-alumina, zirconia, or a combination thereof, for example alumina and/or titania or silica and/or zirconia and/or titania.

One characteristic that can impact the activity of the molecular sieve is the ratio of silica to alumina ($Si/Al_2$ ratio) in the molecular sieve. In an embodiment, the molecular sieve can have a silica to alumina ratio of about 200:1 or less, for example about 150:1 or less, about 120:1 or less, about 100:1 or less, about 90:1 or less, or about 75:1 or less. Additionally or alternately, the molecular sieve can have a silica to alumina ratio of at least about 30:1, for example at least about 40:1, at least about 50:1, or at least about 65:1.

Aside from the molecular sieve(s) and optional binder, the dewaxing catalyst can also optionally but preferably include at least one metal hydrogenation component, such as a Group VIII metal. Suitable Group VIII metals can include, but are not limited to, Pt, Pd, Ni, or a combination thereof. When a metal hydrogenation component is present, the dewaxing catalyst can include at least about 0.1 wt % of the Group VIII metal, for example at least about 0.3 wt %, at least about 0.5 wt %, at least about 1.0 wt %, at least about 2.5 wt %, or at least about 5.0 wt %. Additionally or alternately, the dewaxing catalyst can include about 10 wt % or less of the Group VIII metal, for example about 5.0 wt % or less, about 2.5 wt % or less, about 1.5 wt % or less, or about 1.0 wt % or less.

In some embodiments, the dewaxing catalyst can include an additional Group VIB metal hydrogenation component, such as W and/or Mo. In such embodiments, when a Group VIB metal is present, the dewaxing catalyst can include at least about 0.5 wt % of the Group VIB metal, for example at least about 1.0 wt %, at least about 2.5 wt %, or at least about 5.0 wt %. Additionally or alternately in such embodiments, the dewaxing catalyst can include about 20 wt % or less of the Group VIB metal, for example about 15 wt % or less, about 10 wt % or less, about 5.0 wt % or less, about 2.5 wt % or less, or about 1.0 wt % or less. In one preferred embodiment, the dewaxing catalyst can include Pt and/or Pd as the hydrogenation metal component. In another preferred embodiment, the dewaxing catalyst can include as the hydrogenation metal components Ni and W, Ni and Mo, or Ni and a combination of W and Mo.

In various embodiments, the dewaxing catalyst used according to the invention can advantageously be tolerant of the presence of sulfur and/or nitrogen during processing. Suitable catalysts can include those based on zeolites ZSM-48 and/or ZSM-23. It is also noted that ZSM-23 with a silica to alumina ratio between about 20:1 and about 40:1 is sometimes referred to as SSZ-32. Additional or alternate suitable catalyst bases can include 1-dimensional 10-member ring zeolites. Further additional or alternate suitable catalysts can include EU-2, EU-11, and/or ZBM-30.

A bound dewaxing catalyst can also be characterized by comparing the micropore (or zeolite) surface area of the catalyst with the total surface area of the catalyst. These surface areas can be calculated based on analysis of nitrogen porosimetry data using the BET method for surface area measurement. Previous work has shown that the amount of zeolite content versus binder content in catalyst can be determined from BET measurements (see, e.g., Johnson, M. F. L., *Jour. Catal.*, (1978) 52, 425). The micropore surface area of a catalyst refers to the amount of catalyst surface area provided due to the molecular sieve and/or the pores in the catalyst in the BET measurements. The total surface area represents the micropore surface plus the external surface area of the bound catalyst. In one embodiment, the percentage of micropore surface area relative to the total surface area of a bound catalyst can be at least about 35%, for example at least about 38%, at least about 40%, or at least about 45%. Additionally or alternately, the percentage of micropore surface area relative to total surface area can be about 65% or less, for example about 60% or less, about 55% or less, or about 50% or less.

Additionally or alternately, the dewaxing catalyst can comprise, consist essentially of, or be a catalyst that has not been dealuminated. Further additionally or alternately, the binder for the catalyst can include a mixture of binder materials containing alumina.

Catalytic dewaxing can be performed by exposing a feedstock to a dewaxing catalyst under effective (catalytic) dewaxing conditions. Effective dewaxing conditions can include one or more of the following: a temperature of at least about 500° F. (about 260° C.), for example at least about 550° F. (about 288° C.), at least about 600° F. (about 316° C.), or at least about 650° F. (about 343° C.); a temperature of about 750° F. (about 399° C.) or less, for example about 700° F. (about 371° C.) or less or about 650° F. (about 343° C.) or less; a reaction pressure of at least about 400 psig (about 2.8 MPag), for example at least about 500 psig (about 3.4 MPag), at least about 750 psig (about 5.2 MPag), or at least about 1000 psig (about 6.9 MPag); a pressure of about 1500 psig (about 10 MPag) or less, for example about 1200 psig (about 8.2 MPag) or less, about 1000 psig (about 6.9 MPag) or less, or about 800 psig (about 5.5 MPag) or less; a liquid hourly space velocity (LHSV) of at least about 0.1 $hr^{-1}$, for example at least about 0.5 $hr^{-1}$, at least about 1.0 $hr^{-1}$, or at least about 1.5 $hr^{-1}$; an LHSV of about 10 $hr^{-1}$ or less, for example about 5.0 $hr^{-1}$ or less, about 3.0 $hr^{-1}$ or less, about 2.0 $hr^{-1}$ or less, or about 1.5 $hr^{-1}$ or less; a (hydrogen) treat gas rate of at least about 500 scf/bbl (about 85 $Sm^3/m^3$), for example at least about 750 scf/bbl (about 130 $Sm^3/m^3$), or at least about 1000 scf/bbl (about 170 $Sm^3/m^3$); a (hydrogen) treat gas rate of about 2000 scf/bbl (about 340 $Sm^3/m^3$) or less, for example about 1500 scf/bbl (about 260 $Sm^3/m^3$) or less or about 1250 scf/bbl (about 210 $Sm^3/m^3$) or less.

In various embodiments, a catalytic dewaxing stage may be referred to as a "sweet" or a "sour" stage. This characterization of the catalytic dewaxing stage can refer to the sulfur and/or the nitrogen content present during catalytic dewaxing. In the discussion provided herein, the sulfur content and the nitrogen content present in a catalytic dewaxing stage will be described in terms of a concentration of sulfur or nitrogen in the feed. However, it is understood that some or all of the sulfur and/or nitrogen may be present as a gas phase contaminant. $H_2S$ is an example of a gas phase sulfur contaminant, and $NH_3$ is an example of a gas phase nitrogen contaminant.

It is noted that the gas phase contaminants may be present in a liquid effluent as dissolved gas phase components.

In the embodiments below, the determination of the amount of sulfur and nitrogen is based on the total sulfur and nitrogen present relative to the weight of the hydrocarbon feed. This includes both gas phase species and organically bound species. Thus, even though some sulfur and/or nitrogen may be present as $H_2S$ or $NH_3$, such sulfur and nitrogen should be included when determining the weight parts per million of sulfur/nitrogen relative to the weight of the hydrocarbon feed.

As used herein, a catalytic dewaxing stage can be characterized as a "sweet" stage with respect to sulfur when the sulfur content is about 250 wppm or less, for example about 100 wppm or less or about 50 wppm or less. Also as used herein, a catalytic dewaxing stage can be characterized as a "sour" stage with respect to sulfur when the sulfur content of greater than about 500 wppm, for example greater than about 1000 wppm, greater than about 1250 wppm, or greater than about 1500 wppm. With regard to nitrogen, a catalytic dewaxing stage can be characterized as a "sweet" stage when the nitrogen content is about 20 wppm or less, for example about 15 wppm or less or about 10 wppm or less, and catalytic dewaxing stage can be characterized as a "sour" stage with respect to nitrogen when the can correspond to about 30 wppm or more of nitrogen or about 50 wppm or more, or about 60 wppm or more. As noted above, the concentration of sulfur and/or nitrogen can be in the form of organically bound sulfur and/or nitrogen, gas phase sulfur and/or nitrogen, or a combination thereof.

At the time a feed is exposed to a catalytic dewaxing stage, the feed may be hydrotreated or not. In some embodiments, a "sweet" feed, e.g., a relatively low sulfur feed, can be passed into the catalytic dewaxing stage(s) prior to hydrotreating. Alternately, a hydrotreatment stage followed by a separator can be included as part of the reaction system to attain a "sweet" feed via hydrotreating. There are also several options that can lead to a "sour" feed condition. If the feed is not hydrotreated or is only partially hydrotreated prior to the catalytic dewaxing stage(s), the sulfur content in the feed will continue into the catalytic dewaxing stage(s) with a relatively high sulfur content. Alternately, if the feed is hydrotreated prior to catalytic dewaxing, the feed to the catalytic dewaxing stage can be a direct cascade containing substantially all liquid and gas phase products from the prior hydrotreatment stage, in which case any organic sulfur still in the feed and/or any gas phase sulfur generated in the hydrotreating stage can be passed into the catalytic dewaxing stage(s), thus rendering the feed "sour".

The amount of organic sulfur in the hydrotreated feed can be at least about 1 wppm, for example at least about 5 wppm, at least about 10 wppm, at least about 20 wppm, at least about 30 wppm, at least about 50 wppm, at least about 100 wppm, at least about 250 wppm, or at least about 500 wppm. Additionally or alternately, the amount of organic sulfur in the hydrotreated feed can be about 1000 wppm or less, for example about 750 wppm or less, about 500 wppm or less, about 250 wppm or less, about 100 wppm or less, or about 50 wppm or less, about 30 wppm or less, about 20 wppm or less, or about 10 wppm or less. In some embodiments where a feed is cascaded from a hydrotreatment stage to the dewaxing stage, the amount of gas phase sulfur cascaded into the catalytic dewaxing stage can be at least about 2000 vppm, for example at least about 5000 vppm or at least about 10000 vppm.

In a preferred embodiment, the feedstock to the dewaxing stage(s), the dewaxed feedstock passed to the aromatic saturation (hydrofinishing) stage(s), or both can have a content of polyaromatic hydrocarbons having three or more aromatic rings of at least 0.08 wt %, for example at least 0.1 wt % or at least 0.15 wt %. Additionally or alternately, the dewaxed feedstock passed to the aromatic saturation (hydrofinishing) stage(s), the dewaxed and hydrofinished product, or both can have a cloud point at least about 10° C. lower than the cloud point of the feed into the dewaxing stage(s), for example at least about 20° C. lower, at least about 30° C. lower, or at least about 40° C. lower. Further additionally or alternately, the cloud point of the dewaxed feedstock passed to the aromatic saturation (hydrofinishing) stage(s), of the dewaxed, hydrofinished product, or of both can be about −35° C. or less, for example about −40° C. or less or about −50° C. or less.

Hydrofinishing Process and Catalyst

In an embodiment, an aromatic saturation (hydrofinishing) catalyst can comprise, consist essentially of, or be a Group VIII and/or Group VIB metal on a support material, e.g., an amorphous support such as a bound support from the M41S family, for instance bound MCM-41. In some cases, certain hydrotreatment catalysts (as described below) can also be used as aromatic saturation catalysts. The M41S family of catalysts can be described as mesoporous materials having relatively high silica contents, e.g., whose preparation is further described in J. Amer. Chem. Soc., 1992, 114, 10834. Examples of M41S materials can include, but are not limited to MCM-41, MCM-48, MCM-50, and combinations thereof. Mesoporous is understood to refer to catalysts having pore sizes from about 15 Angstroms to about 100 Angstroms. A preferred member of this class is MCM-41, whose preparation is described, e.g., in U.S. Pat. No. 5,098,684. MCM-41 is an inorganic, porous, non-layered phase having a hexagonal arrangement of uniformly-sized pores. The physical structure of MCM-41 is similar to a bundle of straws, in which the opening of the straws (the cell diameter of the pores) ranges from about 15-100 Angstroms. MCM-48 has a cubic symmetry and is described, for example, in U.S. Pat. No. 5,198,203. MCM-50 has a lamellar structure.

MCM-41 can be made with different size pore openings in the mesoporous range. If binders are desired to be used, suitable binders for the M41S family, and specifically for MCM-41, can include alumina, silica, titania, silica-aluminas, or a combination thereof. Relatively high specific surface areas are possible with such catalysts, such that, in one embodiment, the surface area of the catalyst can be at least about 500 m$^2$/g, for example at least about 600 m$^2$/g. In some embodiments, an even higher surface area catalyst can be selected to further facilitate the aromatic saturation process, for example at least about 750 m$^2$/g, at least about 850 m$^2$/g, or at least about 950 m$^2$/g.

One example of a suitable aromatic saturation catalyst is an alumina-bound mesoporous MCM-41 with a supported hydrogenation metal thereon/therein, e.g., Pt, Pd, another Group VIII metal, a Group VIB metal, or a mixture thereof. Individual hydrogenation metal embodiments can include, but are not limited to, Pt only, Pd only, or Ni only, while mixed hydrogenation metal embodiments can include, but are not limited to, Pt and Pd, Ni and W, Ni and Mo, Ni and Mo and W, Co and Mo, Co and Ni and Mo, or another combination. When present, the amount of Group VIII hydrogenation metal(s) can be at least about 0.1 wt % based on the total weight of the catalyst, for example at least about 0.5 wt % or at least about 0.6 wt %. Additionally or alternately, the amount of Group VIII hydrogenation metal(s) can be about 5.0 wt % or less based on the total weight of the catalyst, for example about 3.5 wt % or less, about 2.5 wt % or less, about 1.5 wt % or less, about 1.0 wt % or less, about 0.9 wt % or less, about 0.75 wt % or less, or about 0.6 wt % or less. Further additionally or alternatively, the total amount of hydrogenation metal(s) can be at least about 0.1 wt % based on the total weight of the catalyst, for example at least about 0.25 wt %, at least about 0.5 wt %, at least about 0.6 wt %, at least about 0.75 wt %, or at least about 1 wt %. Still further additionally or alternatively, the total amount of hydrogenation metal(s) can be about 35 wt % or less based on the total weight of the catalyst, for example about 30 wt % or less, about 25 wt % or less, about 20 wt % or less, about 15 wt % or less, about 10 wt % or less, or about 5 wt % or less.

An aromatic saturation (hydrofinishing) stage can typically operate at conditions including one or more of the following: a temperature from about 150° C. to about 343° C.; an inlet temperature of about 340° C. or less, for example about 320° C. or less, about 300° C. or less, about 280° C. or less, or about 260° C. or less; an inlet temperature of at least about 230° C., for example at least about 250° C. or at least about 275° C.; a total pressure from about 2.9 MPag (about 400 psig) to about 20.8 MPag (about 3000 psig); a liquid hourly space velocity (LHSV) from about 0.1 $hr^{-1}$ to about 5 $hr^{-1}$, for example about 0.5 $hr^{-1}$ to about 3 $hr^{-1}$; and a hydrogen treat gas rates can be from about 42 $Sm^3/m^3$ (about 250 scf/bbl) to about 1700 $Sm^3/m^3$ (about 10,000 scf/bbl). In embodiments where the total hydrogen flow is desired to be maintained at a reduced amount, the hydrogen treat gas rate in the aromatic saturation stage(s) can be about 4500 scf/bbl (about 800 $Sm^3/m^3$) or less, for example about 4000 scf/bbl (about 680 $Sm^3/m^3$) or less, about 3500 scf/bbl (600 $Sm^3/m^3$) or less, or about 3000 scf/bbl (510 $Sm^3/m^3$) or less. Additionally or alternately, the hydrogen treat gas rate in the aromatic saturation stage(s) can be at least about 500 scf/bbl (about 85 $Sm^3/m^3$), for example at least about 750 scf/bbl (about 130 $Sm^3/m^3$) or at least about 1000 scf/bbl (about 170 $Sm^3/m^3$).

The temperature at the inlet of the aromatic saturation stage(s) can advantageously be at least about 20° C. lower than the temperature at the inlet of the dewaxing stage, for example at least about 25° C. lower, at least about 30° C. lower, at least about 35° C. lower, or at least about 40° C. lower. Additionally or alternatively, the temperature at the inlet of the aromatic saturation stage(s) can be at least about 20° C. lower than the temperature at the outlet of the dewaxing stage, for example at least about 25° C. lower, at least about 30° C. lower, at least about 35° C. lower, at least about 40° C. lower, at least about 45° C. lower, or at least about 50° C. lower.

If desired, the dewaxing stage(s) can advantageously be operated at a reduced temperature, such as at an inlet temperature of about 340° C. or less, for example about 320° C. or less, about 300° C. or less, or about 280° C. or less. Additionally or alternatively, the inlet temperature of the aromatic saturation stage(s) can differ from the inlet temperature of the dewaxing stage by about 25° C. or less, for example about 20° C. or less, about 15° C. or less, or about 10° C. or less.

The effective conditions for an aromatic saturation process can be conditions suitable for producing a distillate product having a desired aromatic content. In embodiments where total aromatic content of the dewaxed and hydrofinished product can be an issue, a desired aromatic content goal can correspond to about 5 wt % or less, for example about 4 wt % or less, about 3 wt % or less, or about 2 wt % or less. Additionally or alternately where polyaromatic hydrocarbon content of the dewaxed and hydrofinished product can be an issue, a desired content of polyaromatic hydrocarbons having three or more aromatic rings can correspond to about 0.02 wt % or less, for example about 0.015 wt % or less or about 0.01 wt % or less.

Hydrotreatment Catalyst

In some embodiments, a feed can be hydrotreated prior to further processing, in order to reduce the amount of sulfur, nitrogen, and/or oxygen in the feed prior to exposing the feed to another catalyst that may be sensitive to these heteroatom "contaminants", e.g., to a dewaxing catalyst. A feed can also be exposed to a catalyst for aromatic saturation (hydrofinishing) either prior to or after exposure to a dewaxing catalyst, and the aromatic saturation catalyst may additionally or alternately be sensitive to such heteroatom "contaminants".

In various embodiments, a suitable catalyst for hydrotreatment may be similar to or different from catalysts described herein for aromatic saturation (hydrofinishing), e.g., which can comprise, consist essentially of, or be a catalyst composed of one or more Group VIII and/or Group VIB metals on a support such as a metal oxide support. Suitable metal oxide supports can include relatively low acidic oxides such as silica, alumina, silica-aluminas, titania, or a combination thereof. The supported Group VIII and/or Group VIB metal(s) can include, but are not limited to, Co, Ni, Fe, Mo, W, Pt, Pd, Rh, Ir, and combinations thereof. Individual hydrogenation metal embodiments can include, but are not limited to, Pt only, Pd only, or Ni only, while mixed hydrogenation metal embodiments can include, but are not limited to, Pt and Pd, Pt and Rh, Ni and W, Ni and Mo, Ni and Mo and W, Co and Mo, Co and Ni and Mo, Co and Ni and W, or another combination. When only one hydrogenation metal is present, the amount of that hydrogenation metal can be at least about 0.1 wt % based on the total weight of the catalyst, for example at least about 0.5 wt % or at least about 0.6 wt %. Additionally or alternately when only one hydrogenation metal is present, the amount of that hydrogenation metal can be about 5.0 wt % or less based on the total weight of the catalyst, for example about 3.5 wt % or less, about 2.5 wt % or less, about 1.5 wt % or less, about 1.0 wt % or less, about 0.9 wt % or less, about 0.75 wt % or less, or about 0.6 wt % or less. Further additionally or alternately when more than one hydrogenation metal is present, the collective amount of hydrogenation metals can be at least about 0.1 wt % based on the total weight of the catalyst, for example at least about 0.25 wt %, at least about 0.5 wt %, at least about 0.6 wt %, at least about 0.75 wt %, or at least about 1 wt %. Still further additionally or alternatively when more than one hydrogenation metal is present, the collective amount of hydrogenation metals can be about 35 wt % or less based on the total weight of the catalyst, for example about 30 wt % or less, about 25 wt % or less, about 20 wt % or less, about 15 wt % or less, about 10 wt % or less, or about 5 wt % or less. In embodiments wherein the supported metal comprises a noble metal, the amount of noble metal(s) is typically less than about 2 wt %, for example less than about 1 wt %, about 0.9 wt % or less, about 0.75 wt % or less, or about 0.6 wt % or less. The amounts of metal(s) may be measured by methods specified by ASTM for individual metals, including but not limited to atomic absorption spectroscopy (AAS), inductively coupled plasma-atomic emission spectrometry (ICP-AAS), or the like.

Hydrotreating conditions can typically include one or more of the following: a temperature up to about 426° C., for example from about 150° C. to about 400° C. or from about 200° C. to about 350° C.; a hydrogen partial pressure and/or a total pressure from about 1.5 MPag (about 200 psig) to about 20.8 MPag (about 3000 psig), for example from about 2.9 MPag (about 400 psig) to about 13.9 MPag (about 2000 psig); a space velocity (e.g., LHSV) from about 0.1 $hr^{-1}$ to about 10 $hr^{-1}$, for example from about 0.1 $hr^{-1}$ to about 5 $hr^{-1}$ or from about 1 $hr^{-1}$ to about 10 $hr^{-1}$; and a hydrogen to feed treat gas ratio from about 85 $Sm^3/m^3$ (about 500 scf/bbl) to about 1700 Sm³/m³ (about 10,000 scf/bbl), for example from about 170 Sm³/m³ (about 1000 scf/bbl) to about 850 Sm³/m³ (about 5000 scf/bbl). It is noted that, in some embodiments, the total hydrogen treat gas rate in the dewaxing and aromatic saturation stages can be controlled to be less than a desired value, such as about 4500 scf/bbl (about 800 Sm³/m³) or less. In most embodiments, any hydrotreatment stage(s) located upstream of the dewaxing and/or aromatic saturation stages are not included in this total hydrogen treat gas rate value, though, in other embodiments, a total hydrogen treat gas rate for combined hydrotreatment, dewaxing, and aromatic saturation stages may still be about 4500 scf/bbl (about 800 Sm³/m³) or less, for example about 4000 scf/bbl (about 680 Sm³/m³) or less, about 3500 scf/bbl (600 Sm³/m³) or less, or about 3000 scf/bbl (510 Sm³/m³) or less.

Sample Reaction Systems

FIG. 1 schematically shows an example of a reaction system suitable for processing of a hydrocarbon feed according to the invention. The embodiment shown in FIG. 1 depicts a single reactor 100 that includes two beds or stages of dewaxing catalyst 110 and 111, and one bed or stage of aromatic saturation catalyst 120.

In the embodiment shown in FIG. 1, a hydrocarbon feed 105 and a hydrogen stream 107 are introduced into the reactor 100. Optionally, feed 105 and hydrogen stream 107 could be introduced via the same conduit. The feed can then be exposed to the dewaxing catalyst 110 under dewaxing conditions. A quench stream 115 can be introduced after the first dewaxing bed 110 to modify the temperature of the at least partially dewaxed feed. Note that quench stream 115 is optional, and might not be present in some embodiments. For example, quench stream 115 might not be present in an embodiment that involves only one dewaxing bed or stage. The optionally quenched, at least partially dewaxed feed can then be exposed to second dewaxing catalyst bed 111 under similar or different dewaxing conditions. The effluent from the dewaxing catalyst bed 111 can then be quenched with quench stream 125. Optionally, quench stream 125 can include a recycled portion of product stream 135 (not shown). The quenched, dewaxed stream can then be exposed to aromatic saturation catalyst 120 under effective aromatic saturation (hydrofinishing) conditions. The resulting dewaxed, relatively low aromatic diesel stream 135 can then undergo further processing, or can be added to the diesel fuel pool without further processing.

Figure 2:
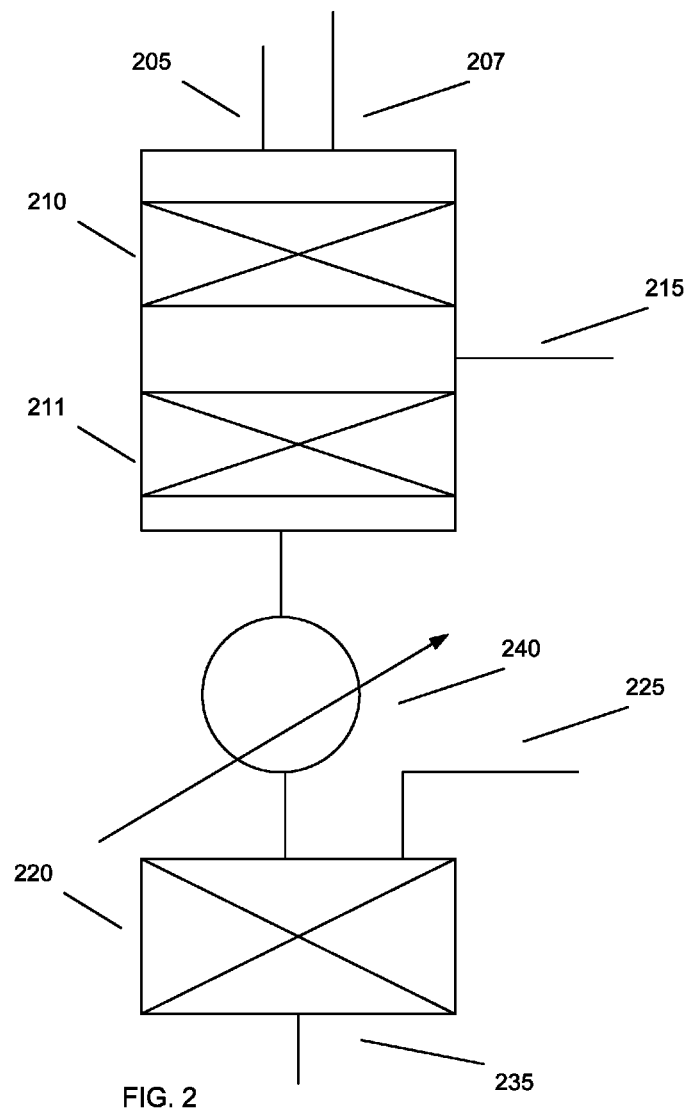
FIG. 2 schematically shows an example of a reaction system suitable for processing of a hydrocarbon feed according to the invention.

FIG. 2 depicts an alternative embodiment where the dewaxing and aromatic saturation stages are placed in separate reactors. As in FIG. 1, a feed 205 and a hydrogen stream 207 are introduced into a first reactor. The feed can thus be exposed to dewaxing catalyst in beds or stages 210 and 211. An optional quench stream 215 can be introduced between dewaxing catalyst beds 210 and 211. In the embodiment shown in FIG. 2, the effluent from the dewaxing beds can be passed into a heat exchanger 240 in order to control the temperature. The cooled effluent from the heat exchanger can then be exposed to aromatic saturation catalyst in bed 220, along with optional additional hydrogen stream 225. The resulting dewaxed, relatively low aromatic diesel stream 235 can then undergo further processing, or can be added to the diesel fuel pool without further processing.

Figure 3:
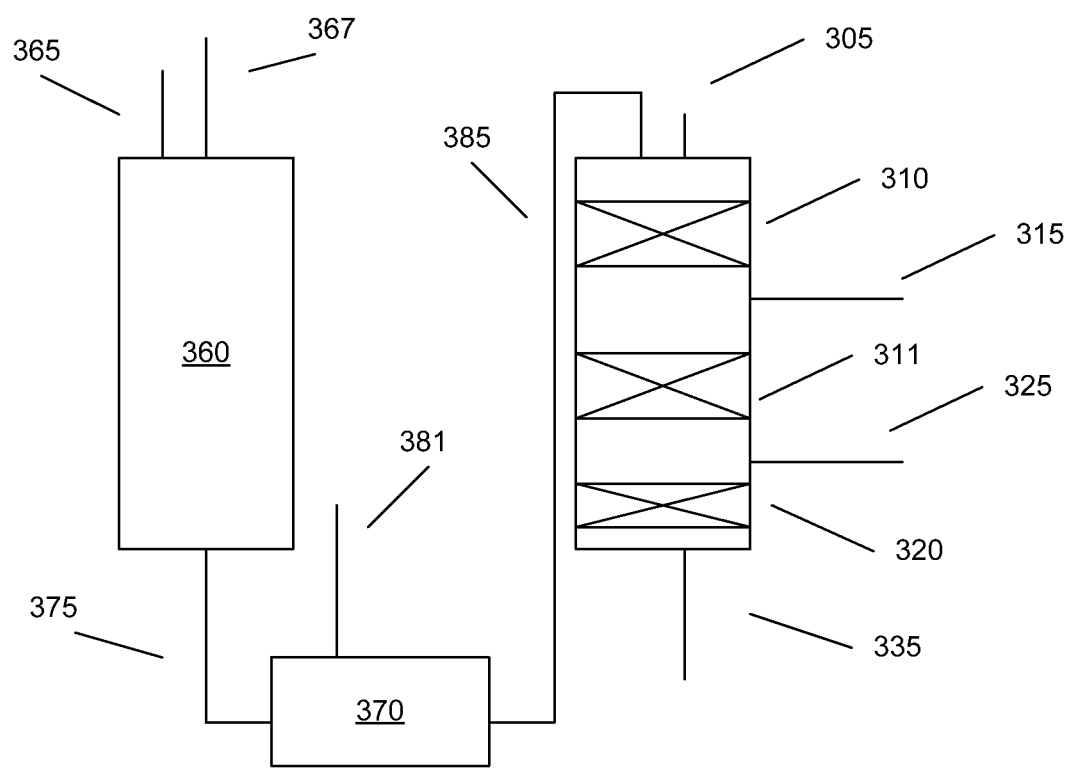
FIG. 3 schematically shows an example of a reaction system suitable for processing of a hydrocarbon feed according to the invention.

FIG. 3 depicts an embodiment where a hydrotreatment stage is shown prior to the dewaxing stages. In FIG. 3, a feed 365 and a hydrogen stream 367 are introduced into a hydrotreatment reactor 360. The feed can be hydrotreated under effective conditions to produce an at least partially hydrotreated effluent 375. The hydrotreated effluent can be separated in optional separator 370 to remove a gas phase stream 381. When a separator is present, this can allow for removal of gas phase contaminants, such as $H_2S$ and/or $NH_3$, that can be produced during hydrotreatment. The separated effluent 385 can then be passed into dewaxing bed/stage 310, optionally but preferably along with a hydrogen stream 305. After the first dewaxing bed, the feed can optionally be quenched with stream 315, and then can be passed into the second dewaxing bed 311. Another quench stream 325 can be used to control the temperature before exposing the dewaxed feed to aromatic saturation catalyst in bed 320. The resulting dewaxed, relatively low aromatic diesel stream 335 can then undergo further processing, or can be added to the diesel fuel pool without further processing.

Note that, in some alternative embodiments, separator 370 can be omitted. Instead in those embodiments, effluent 375 can be directly cascaded into the dewaxing stage(s). In such embodiments, there may be sufficient hydrogen included in the cascaded effluent so as to render hydrogen stream 305 optional. It should also be understood that, though FIGS. 1-3 depict embodiments in which two dewaxing beds/stages are combined with a single aromatic saturation bed/stage, also generally contemplated are other embodiments containing arrangements of single or multiple dewaxing bed(s)/stage(s) in combination with single or multiple aromatic saturation bed(s)/stage(s), with optional heat control (e.g., quenching and/or heat exchange) in between dewaxing beds/stages, in between aromatic saturation beds/stages, prior to the initial bed/stage in the dewaxing/hydrofinishing process, after to the final bed/stage in the dewaxing/hydrofinishing process, and/or between the final dewaxing bed/stage and the initial aromatic saturation bed/stage.

Other Embodiments

Additionally or alternately, the present invention can include one or more of the following embodiments.

Embodiment 1

A method for producing a diesel fuel, comprising: treating a distillate boiling range feed by contacting the feed with a dewaxing catalyst under effective dewaxing conditions to form a dewaxed effluent, the effective dewaxing conditions including a dewaxing inlet temperature and a dewaxing outlet temperature, the dewaxing catalyst comprising a zeolitic molecular sieve and a hydrogenation metal; quenching the dewaxed effluent; and treating the quenched dewaxed effluent with an aromatic saturation catalyst different than the dewaxing catalyst under effective aromatic saturation conditions to form a product having a concentration of polyaromatic hydrocarbons with three or more rings of about 0.02 wt % or less, the effective aromatic saturation conditions including an inlet temperature that is at least about 20° C. lower than the dewaxing outlet temperature, wherein the dewaxed effluent, the quenched dewaxed effluent, or both exhibit a cloud point at least 10° C. lower than a cloud point of the distillate boiling range feed, and wherein the distillate boiling range feed, the quenched dewaxed effluent, or both exhibit a concentration of polyaromatic hydrocarbons with three or more rings of about 0.08 wt % or more.

Embodiment 2

A method for producing a diesel fuel, comprising: treating a distillate boiling range feed by contacting the feed with a dewaxing catalyst under effective dewaxing conditions to form a dewaxed effluent, the effective dewaxing conditions including a dewaxing inlet temperature and a dewaxing outlet temperature, the dewaxing catalyst comprising a zeolitic molecular sieve and a hydrogenation metal; quenching the dewaxed effluent; and treating the quenched dewaxed effluent with an aromatic saturation catalyst different than the dewaxing catalyst under effective aromatic saturation conditions including an inlet temperature for the aromatic saturation that differs from the dewaxing inlet temperature by about 25° C. or less, the inlet temperature for the aromatic saturation stage being about 300° C. or less, wherein the dewaxed effluent, the quenched dewaxed effluent, or both exhibit a cloud point at least 10° C. lower than a cloud point of the distillate boiling range feed.

Embodiment 3

The method of embodiment 1, wherein the inlet temperature for the aromatic saturation is about 320° C. or less.

Embodiment 4

The method of embodiment 2, wherein the distillate boiling range feed, the quenched dewaxed effluent, or both exhibit a concentration of polyaromatic hydrocarbons with three or more rings of about 0.08 wt % or more, and wherein treating the quenched dewaxed effluent with an aromatic saturation catalyst produces a product having a content of polyaromatic hydrocarbons having three or more rings of about 0.02 wt % or less.

Embodiment 5

The method of any one of the previous embodiments, wherein a combined treat gas rate for the dewaxing treatment and the aromatic saturation treatment is less than about 4500 scf/bbl (about 800 Sm$^3$/m$^3$).

Embodiment 6

The method of any one of the previous embodiments, wherein a sulfur content of the distillate boiling range feed is about 50 wppm or less, at least about 500 wppm, or both.

Embodiment 7

The method of any one of the previous embodiments, wherein a surface area of the aromatic saturation catalyst is at least about 750 m$^2$/g.

Embodiment 8

The method of any one of the previous embodiments, wherein the dewaxing catalyst comprises a zeolitic catalyst and the aromatic saturation catalyst comprises a non-zeolitic catalyst.

Embodiment 9

The method of any one of the previous embodiments, wherein quenching the dewaxed effluent comprises using a heat exchanger, using a recycled effluent from the aromatic saturation treatment, or both.

Embodiment 10

The method of any one of the previous embodiments, wherein contacting the feed with a dewaxing catalyst comprises contacting the feed with at least two beds of dewaxing catalyst, the method further comprising quenching an effluent from contact with the first bed of dewaxing catalyst prior to contacting with the second bed of dewaxing catalyst.

Embodiment 11

The method of embodiment 10, wherein each bed of dewaxing catalyst has a dewaxing inlet temperature, the dewaxing inlet temperature for the second bed corresponding approximately to a temperature, after quenching, of the effluent from contact with the first bed of dewaxing catalyst.

Embodiment 12

The method of any one of the previous embodiments, wherein the aromatic saturation catalyst comprises alumina-bound MCM-41.

Embodiment 13

The method of any one of the previous embodiments, wherein the aromatic saturation catalyst comprises from about 0.1 wt % to about 1.5 wt % of Pt, Pd, or a combination thereof.

Example for One and Two Reactor Configurations

The following example is based on process simulations using a kinetic model. In the simulations, a feedstock is represented as a plethora of groups of molecules, based on the carbon number of the molecules and the molecular class of the molecules. Based on the process conditions selected for the simulation (such as pressure, temperature, hydrogen treat gas rate, and/or space velocity, inter alia), the reaction order and reaction rate for each group of molecules is selected to be appropriate for the group. Suitable reaction order and/or reaction rate data for different types/groups of molecules can be obtained from the published literature, or reaction order and/or reaction rate data can be generated experimentally. The products of the reaction calculations for each group of molecules are used to determine an output product in the simulation. In the reaction calculations, aromatics equilibrium can also be considered and preferably used to modify the calculated aromatics content in the product.

A hydrotreated diesel generated from a blend of 70% petroleum (mineral) diesel fraction and 30% Tall oil was used as feed for a process simulation. Table 1 shows the feed properties for the simulated feed.

TABLE 1

| Feed Properties | | |
|---|---|---|
| Property | Feed | Target |
| Density @ 15° C. [kg/m$^3$] | 825 | 800-830 |
| Sulfur [wppm] | <3 | |
| Nitrogen [wppm] | <1 | |
| Oxygen [wppm] | 500 | |
| Cloud Point [° C.] | −3 | −30 |
| Total Aromatics [vol %] | 17 | <4 |
| 3+ Ring PAH [vol %] | 0.1 | <0.02 |
| Distillation (D86) [° C.] | | |
| Initial Boiling Pt. | 205 | |
| 10% | 214 | |
| 30% | 239 | |
| 50% | 262 | |
| 70% | 284 | |
| 90% | 307 | |
| 95% | 320 | 300-330 |
| Final Boiling Pt. | 333 | |

Process estimates were conducted for an ~8800 barrel/day (or about 58.3 m³/hr) unit using the feed shown in Table 1. Two approaches were simulated. One approach was a single-reactor approach that simulated a configuration similar to the one shown in FIG. 1, while the other approach was a two-reactor approach that simulated a configuration similar to the one shown in FIG. 2.

In each of the simulations, three beds of catalyst were simulated. A first bed of catalyst contained approximately 5 m³ of a dewaxing (isomerization) catalyst. A second bed of catalyst contained approximately 10 m³ of the same dewaxing (isomerization) catalyst. A third bed of catalyst contained approximately 10 m³ of an aromatic saturation (hydrofinishing) catalyst. In the two-reactor configuration, this third bed of catalyst was located in the second reactor. The dewaxing (isomerization) catalyst in both beds of both simulations corresponded to an alumina-bound ZSM-48 catalyst including about 0.6 wt % of Pt hydrogenation metal, while the aromatic saturation (hydrofinishing) catalyst in both simulations corresponded to an alumina-bound MCM-41 catalyst including about 0.6 wt % of Pt hydrogenation metal.

In both the simulations, the inlet pressure for the first reactor was set at about 70 barg (about 7.0 MPag). The estimated temperature profiles for each catalyst bed are shown in Table 2, which describes similar operating conditions. There is a small difference in the outlet temperature for the aromatic saturation bed in the single-reactor versus the two-reactor configuration. This is believed to be due to a difference in the amount of quench gas used.

As shown in Table 2, the inlet temperature for the aromatic saturation bed appears lower than the outlet temperature of the final dewaxing bed. For the single-reactor configuration, the desired inlet temperature for the aromatic saturation bed can be achieved by using a relatively large flow rate of quench gas. In the two-reactor configuration, a heat exchanger can be used to modify the temperature. Table 3 below shows flow rates for the make-up gas, recycle gas, and quench gas for both configurations.

TABLE 2

Reactor Operating Conditions

|  | Units | Single Reactor | Dual Reactor |
|---|---|---|---|
| Inlet Pressure | Barg (MPa) | 70 (7.0) | 70 (7.0) |
| Dewaxing |  | Bed 1 | Reactor 1 - Bed 1 |
| Inlet Temp | °C. | 284 | 284 |
| Outlet Temp | °C. | 306 | 305 |
| Outlet – Inlet Temp diff. | °C. | 22 | 21 |
|  |  | Bed 2 | Reactor 1 - Bed 2 |
| Inlet Temp | °C. | 294 | 294 |
| Outlet Temp | °C. | 318 | 318 |
| Outlet – Inlet Temp diff. | °C. | 24 | 24 |
| Aromatic Saturation |  | Bed 3 | Reactor 2 - Bed 1 |
| Inlet Temp | °C. | 274 | 274 |
| Outlet Temp | °C. | 279 | 281 |
| Outlet – Inlet Temp diff. | °C. | 5 | 7 |

TABLE 3

Gas Streams

|  | Units | Single Reactor | Dual Reactor |
|---|---|---|---|
| Treat Gas to . . . |  | Bed 1 | Reactor 1 - Bed 1 |
| Flow Rate | Sm³/m³ | 126 | 251 |
| Quench Gas to . . . |  | Bed 2 | Reactor 1 - Bed 2 |
| Flow Rate | Sm³/m³ | 83 | 77 |

TABLE 3-continued

Gas Streams

|  | Units | Single Reactor | Dual Reactor |
|---|---|---|---|
| Quench Gas to . . . |  | Bed 3 | Reactor 2 - Bed 1 |
| Flow Rate (60° C. quench gas temp.) | Sm³/m³ | 365 | 0 |
| Make up $H_2$ gas |  |  |  |
| Flow Rate | Sm³/m³ | 73 | 75 |
| $H_2$ purity | vol % | 95 | 95 |
| Recycle gas (excluding make up gas) | Sm³/m³ | 501 | 253 |

In Table 3, the total gas flow can be determined by adding the flow rate of make up $H_2$ gas and the recycle gas. The total gas flow can additionally or alternately be determined by adding the gas flows of treat gas and/or quench gas delivered to each bed. As shown in Table 3, the single reactor configuration appears to require a larger recycle compressor, since a significant amount of recycle gas is used as the quench gas to cool the effluent from the final dewaxing bed to the desired inlet temperature for the aromatic saturation bed. Both approaches produced diesel fuel product meeting specifications on cloud point, total aromatics, PAH, and endpoint boiling temperature (95% on D86), as shown in Table 4.

TABLE 4

Diesel Properties

|  | Units | Single Reactor Config. | Dual Reactor Config. |
|---|---|---|---|
| Specific Gravity @ 60° F. (target: 800-830) | Kg/m³ | 819 | 819 |
| Total Aromatics (target: <4) | Vol % | 4.0 | 3.9 |
| PAH (3+ ring) (target: <0.02) | Vol % | 0.015 | 0.015 |
| Cetane Index D976-80 |  | 57.2 | 57.2 |
| Cetane Index D4737 |  | 58.9 | 58.9 |
| Cloud Point (target: -30) | °C. | -31 | -30 |
| D86 IBP | °C. | 210 | 210 |
| D86 10% | °C. | 216 | 216 |
| D86 30% | °C. | 239 | 239 |
| D86 50% | °C. | 262 | 262 |
| D86 70% | °C. | 284 | 284 |
| D86 90% | °C. | 305 | 305 |
| D86 95% (target: <320) | °C. | 313 | 313 |
| D86 FBP | °C. | 329 | 329 |

Although the present invention has been described in terms of specific embodiments, it is not so limited. Suitable alterations/modifications for operation under specific conditions should be apparent to those skilled in the art. It is therefore intended that the following claims be interpreted as covering all such alterations/modifications as fall within the true spirit/scope of the invention.

What is claimed is:

1. A method for producing a diesel fuel, comprising:
   treating a diesel boiling range feed having a cloud point of about 5° C. or less by contacting the feed with a dewaxing catalyst under effective dewaxing conditions to form a dewaxed effluent, the effective dewaxing conditions including a dewaxing inlet temperature and a dewaxing outlet temperature, the dewaxing catalyst comprising a zeolitic molecular sieve and a hydrogenation metal;
   quenching the dewaxed effluent using a recycled effluent from the aromatic saturation treatment, the dewaxed effluent having a cloud point of about -30° C. or less; and treating the quenched dewaxed effluent with an aromatic saturation catalyst different than the dewaxing catalyst under effective aromatic saturation conditions to form a product having a concentration of polyaromatic hydrocarbons with three or more rings of about 0.02 wt % or less, the effective aromatic saturation conditions including an inlet temperature that is at least about 20° C. lower than the dewaxing outlet temperature, the dewaxing catalyst and the aromatic saturation catalyst being located in the same reactor, wherein the dewaxed effluent, the quenched dewaxed effluent, or both exhibit a cloud point at least 10° C. lower than a cloud point of the diesel boiling range feed, and wherein the diesel boiling range feed, the quenched dewaxed effluent, or both exhibit a concentration of polyaromatic hydrocarbons with three or more rings of about 0.08 wt % or more.

2. The method of claim 1, wherein a combined treat gas rate for the dewaxing treatment and the aromatic saturation treatment is less than about 4500 scf/bbl (about 800 Sm$^3$/m$^3$).

3. The method of claim 1, Wherein a sulfur content of the diesel boiling range feed is about 50 wppm or less.

4. The method of claim 1, wherein a sulfur content of the diesel boiling range feed is at least about 500 wppm.

5. The method of claim 1, wherein a surface area of the aromatic saturation catalyst is at least about 750 m$^2$/g.

6. The method of claim 1, wherein the dewaxing catalyst comprises a zeolite catalyst and the aromatic saturation catalyst comprises a non-zeolitic catalyst.

7. The method of claim 1, wherein the inlet temperature for the aromatic saturation is about 320° C. or less.

8. The method of claim 1, wherein quenching the dewaxed effluent comprises using a heat exchanger.

9. The method of claim 1, wherein contacting the diesel boiling range feed with a dewaxing catalyst comprises contacting the diesel boiling range feed with at least two beds of dewaxing catalyst, the method further comprising quenching an effluent from contact with the first bed of dewaxing catalyst prior to contacting with the second bed of dewaxing catalyst.

10. The method of claim 9, wherein each bed of dewaxing catalyst has a dewaxing inlet temperature, the dewaxing inlet temperature for the second bed corresponding approximately to a temperature, after quenching, of the effluent from contact with the first bed of dewaxing catalyst.

11. The method of claim 1, wherein the aromatic saturation catalyst comprises alumina-bound MCM-41.

12. The method of claim 11, wherein the aromatic saturation catalyst comprises from about 0.1 wt % to about 1.5 wt % of Pt, Pd, or a combination thereof.

13. A method for producing a diesel fuel, comprising:
treating a diesel boiling range feed having a cloud point of about 5° C. or less by contacting the feed with a dewaxing catalyst under effective dewaxing conditions to form a dewaxed effluent, the effective dewaxing conditions including a dewaxing inlet temperature and a dewaxing outlet temperature, the dewaxing catalyst comprising a zeolitic molecular sieve and a hydrogenation metal;
quenching the dewaxed effluent; and
treating the quenched dewaxed effluent with an aromatic saturation catalyst different than the dewaxing catalyst under effective aromatic saturation conditions including an inlet temperature for the aromatic saturation that differs from the dewaxing inlet temperature by about 25° C. or less, the inlet temperature for the aromatic saturation stage being about 300° C. or less, wherein contacting the diesel boiling range feed with a dewaxing catalyst comprises contacting the diesel boiling range feed with at least two beds of dewaxing catalyst, the method further comprising quenching an effluent from contact with the first bed of dewaxing catalyst prior to contacting with the second bed of dewaxing catalyst, and wherein the dewaxed effluent, the quenched dewaxed effluent, or both exhibit a cloud point at least 10° C. lower than a cloud point of the diesel boiling range feed.

14. The method of claim 13, wherein treating the quenched dewaxed effluent with an aromatic saturation catalyst produces a product having a content of polyaromatic hydrocarbons having three or more rings of about 0.02 wt % or less.

15. The method of claim 13, wherein a combined treat gas rate for the dewaxing treatment and the aromatic saturation treatment is less than about 400 scf/bbl (about 800 Sm$^3$/m$^3$).

16. The method of claim 13, wherein a surface area of the aromatic saturation catalyst is at least about 750 m$^2$/g.

17. The method of claim 13, wherein quenching the dewaxed effluent comprises using a heat exchanger.

18. The method of claim 13, wherein the aromatic saturation catalyst comprises alumina-bound MCM-41.

19. The method of claim 18, wherein the aromatic saturation catalyst comprises from about 0.1 wt. % to about 1.5 wt. % of Pt, Pd, or a combination thereof.

20. The method of claim 13, wherein quenching the dewaxed effluent comprises using a recycled effluent from the aromatic saturation treatment.

* * * * *